(No Model.) 2 Sheets—Sheet 2.
J. K. PROCTOR.
FRICTION CLUTCH.
No. 286,556. Patented Oct. 9, 1883.
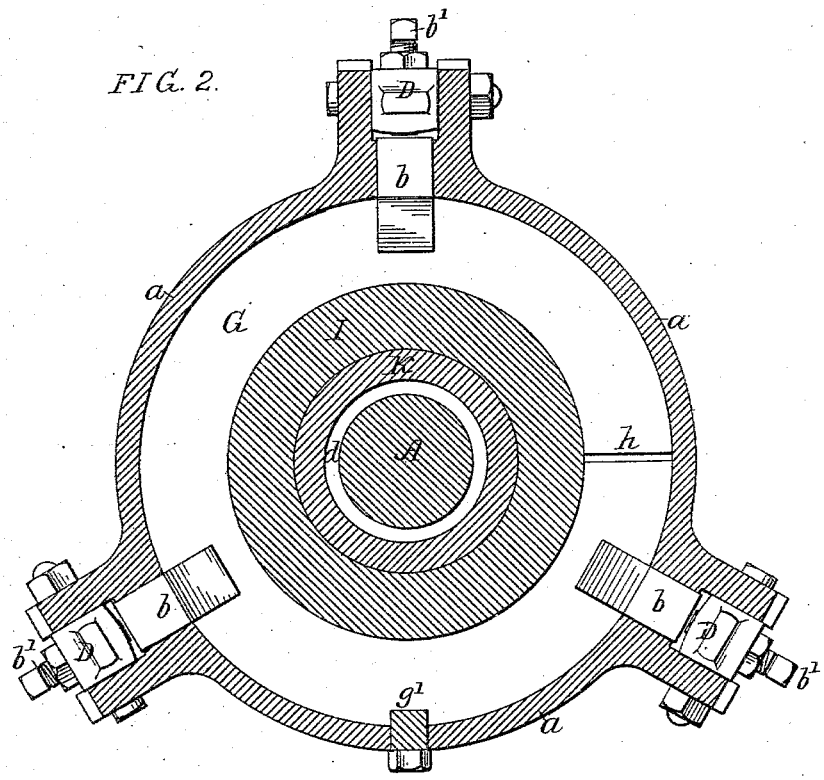
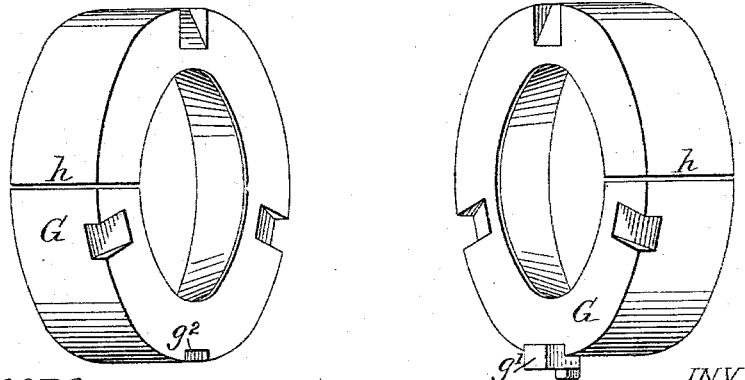
WITNESSES:
Harry L. Ashenfelter.
James F. Tobin
INVENTOR:
Josiah K. Proctor
by his Attorneys,
Howson & Sons

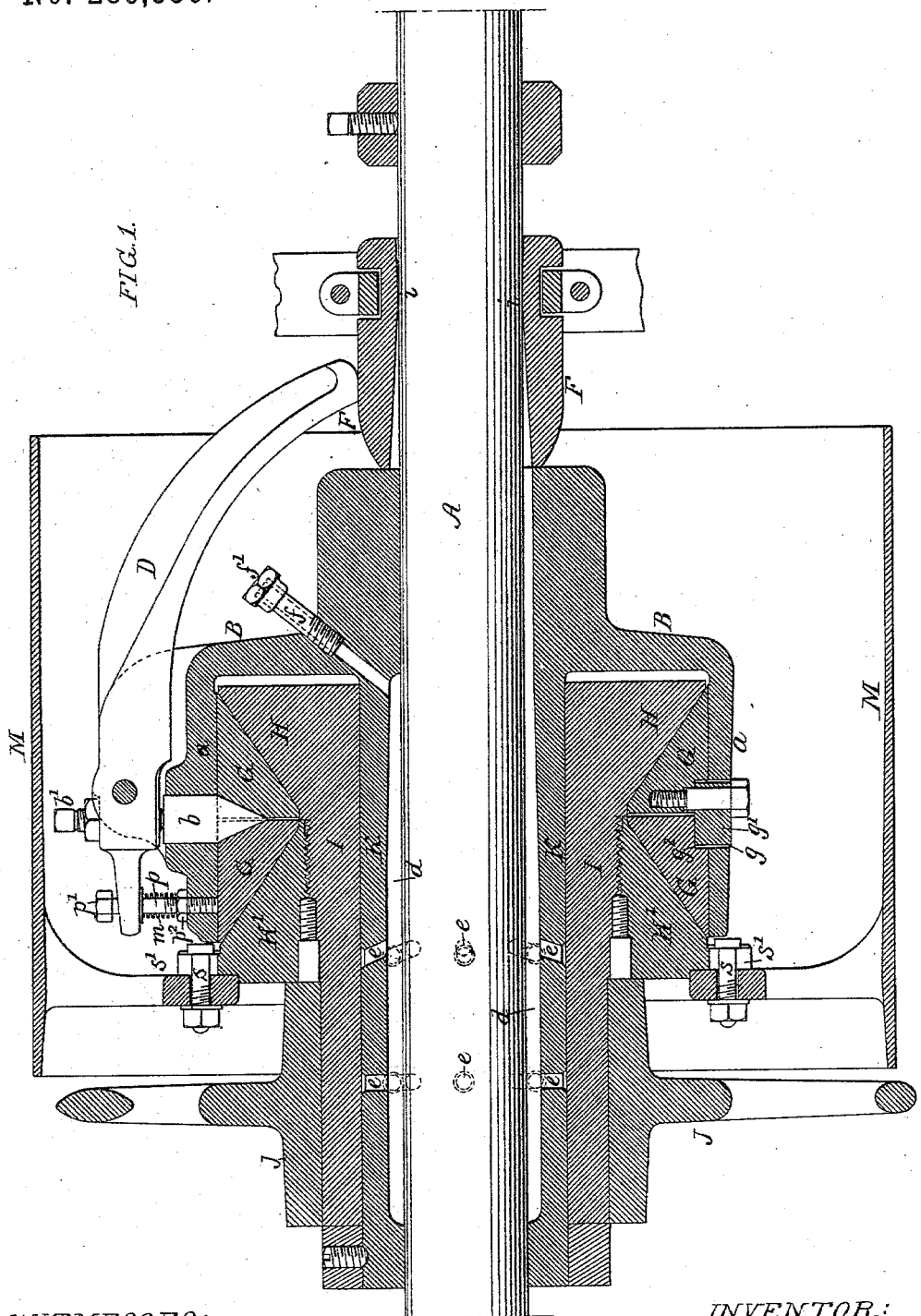

UNITED STATES PATENT OFFICE.

JOSIAH K. PROCTOR, OF PHILADELPHIA, PENNSYLVANIA, ASSIGNOR TO THE JAMES SMITH WOOLEN MACHINERY COMPANY, OF SAME PLACE.

FRICTION-CLUTCH.

SPECIFICATION forming part of Letters Patent No. 286,556, dated October 9, 1883.

Application filed August 20, 1883. (No model.)

*To all whom it may concern:*

Be it known that I, JOSIAH K. PROCTOR, a citizen of the United States, and a resident of Philadelphia, Pennsylvania, have invented certain Improvements in Friction-Clutches, of which the following is a specification.

My invention relates to certain improvements in the friction-clutch for which Letters Patent No 252,192 were granted to Samuel S. Cook on the 10th day of January, 1882, my improvements comprising certain details in the construction of the clutch, with the view of rendering the same smooth in its running and certain in its action, and of protecting the parts from injury.

In the accompanying drawings, Figure 1, Sheet 1, is a longitudinal sectional view of my improved clutch; Fig. 2, a transverse section of the same on the line 1 2; Fig. 3, a perspective view of the friction-rings on a reduced scale.

A represents the driving-shaft, to which is keyed or otherwise secured the disk B, having a flange, $a$, to lugs on which are pivoted the three levers D, the long arms of the latter being acted upon by the sliding conical sleeve F, and the short arms of the levers having set-screws $b'$ bearing upon bolts $b$, adapted to slide in openings in the flange $a$. These bolts have wedge-shaped inner ends adapted to notches in conical rings G, so that as the plugs are forced inward the rings will be driven apart and caused to bear upon the conical flanges H H' of a sleeve, I, secured to the hub of the pulley J, which is to be clutched to or released from the shaft. As the rings G are carried around with the disk B, it will be evident that when the wedges $b$ are forced inward, and the rings expanded into frictional contact with the flanges H H', the sleeve I and pulley J will be caused to revolve with the disk; but when the wedges are retracted and the rings G freed from frictional contact with the flanges H H', the pulley J will be released from the control of the disk B. This is the form of clutch described in the above-mentioned patent of S. S. Cook, and I will now describe my improvements thereon.

The disk B has an elongated hub, K, which forms an extended bearing for the sleeve I, and thus insures the true running of the sleeve with the disk, the hub K having an internal chamber, $d$, surrounding the shaft A and communicating through passages $e$ with the bearing-surface of the sleeve I, so that when a supply of oil has been deposited in the chamber $d$ there will be a uniform and continuous lubrication of the bearing. Oil is introduced into the chamber $d$ through a tube, $f$, provided with a detachable cap, $f'$.

In the Cook clutch the engagement of the inner ends of the bolts $b$ with the notches in the rings G was relied upon to cause the turning of said rings with the disk. I provide an additional means of driving by adapting to an opening, $g$, in the flange $a$, a block, $g'$, which is bolted to one of the rings G, and fits snugly in a notch, $g^2$, in the other ring. (See Figs. 1 and 3.)

Instead of using solid rings G, as in the patented clutch, I split each ring, as shown at $h$, Fig. 2, so that said rings are at liberty to yield to accommodate themselves to slight inequalities in the flanges H H', more perfect frictional contact of the driving-surfaces, and greater certainty in the action of the clutch being thus insured.

The conical sleeve F, which operates the levers D, has a central opening beveled in opposite directions from the point $i$ at which it bears upon the shaft A, so that said sleeve is free to yield transversely in respect to the shaft. The object of this construction is to insure uniform and simultaneous action of all of the wedge-bolts on the rings. When the conical sleeve fits snugly to the shaft, very accurate adjustment of the set-screws $b'$ of the levers D is necessary in order to insure such uniform action, and if there is any variation in the adjustment it results in unequal thrust on the bolts $b$ and uneven wear of the parts. By allowing the sleeve to yield as described, however, it will accommodate itself to the levers and exert a uniform pressure upon all, so that such accurate adjustment of the set-screws $b'$ is not demanded as in the patented clutch.

I have shown the double bevel as the simplest means of carrying out this feature of my invention; but any desired form of universal joint may be adopted, and this feature of the invention may also be applied to a sleeve, which is connected by links to the levers, in place of being made conical, and the universally-jointed sleeve may be used in other forms of clutches in which two or more operating-levers are employed.

In order to prevent the long arms of the levers from being thrown out by centrifugal force, so as to cause the depression of the bolts $b$ and the clutching of the pulley to the shaft, I combine with each lever a spring, $m$, which bears upon the short arm of the lever and serves to throw the long arm of the same toward the shaft, the spring being strong enough to counteract the centrifugal force. A bolt, $p$, passes through a slot in the short arm of each lever, this bolt screwing into the flange $a$ and having a head, $p'$, for limiting the movement of the lever, and a nut, $p^2$, for regulating the tension of the spring $m$. A pull-spring, acting on the long arm of the lever, may be substituted for the spring $m$, if desired. A hood, M, covers and protects the operating parts of the clutch, this hood being secured by bolts $s$ to slotted lugs $s'$ on the flange H'. This flange is detachable in order to permit the insertion and removal of the rings G; but some of the features of my invention may be used in connection with a clutch having but one ring G, as set forth in said patent of S. S. Cook, and in some cases the flanges may be formed on or secured to the hub of the pulley J, instead of being carried by a sleeve, I.

My improved clutch may be used to couple two shafts together as well as to clutch a pulley to a shaft, as will be readily understood.

I claim as my invention—

1. The combination of the shaft A, the flanged hub or sleeve I, the friction ring or rings G, the wedge-bolts, the operating-levers D, and the disk B, carrying said levers, and having an elongated hub, K, forming a bearing for the hub or sleeve I, and having an oil chamber and passages, as set forth.

2. The combination of the shaft A, the hub or sleeve I, having conical flange or flanges, the split conical friction ring or rings G, the disk B, and the levers D, and wedge-bolts $b$, adapted to press the ring or rings G against the conical flange or flanges of the hub or sleeve I, as set forth.

3. The combination of the flanged hub or sleeve with the disk B, the wedge-bolts $b$, the friction-rings G, and the drive-block $g'$, as set forth.

4. The combination of two or more levers D of a friction-clutch with the operating-sleeve F, universally jointed to the shaft and free to slide thereon, as set forth.

5. The combination of the shaft A, the flanged hub or sleeve I, the friction ring or rings G, the disk B, the levers D, the wedge-bolts $b$, and the sliding and universally-jointed sleeve F, as set forth.

6. The combination of the shaft A, the disk B, and the clutch-operating levers D, projecting longitudinally therefrom in line with the shaft, with the hood M, projecting over said levers, as set forth.

In testimony whereof I have signed my name to this specification in the presence of two subscribing witnesses.

JOSIAH K. PROCTOR.

Witnesses:
HARRY L. ASHENFELTER,
HARRY SMITH.